Figure 1:
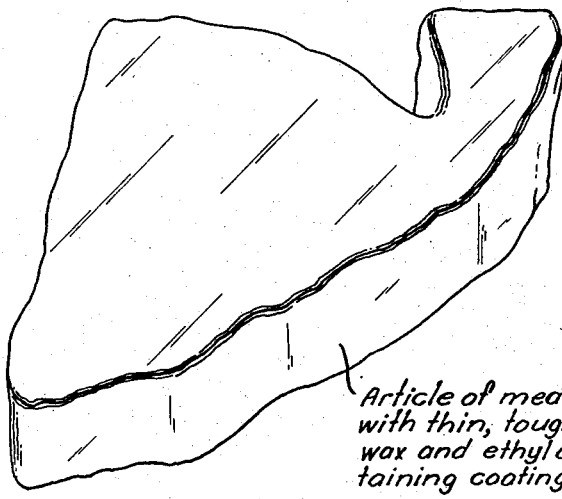

Oct. 20, 1959

L. E. PATTEN ET AL 2,909,434

METHOD OF COATING ARTICLES OF FOOD
AND PRODUCT OBTAINED THEREBY

Filed Dec. 23, 1957

Article of meat provided with thin, tough, peelable wax and ethyl cellulose-containing coating.

Thin, tough, peelable wax and ethyl cellulose-containing coating.

INVENTORS.
Lorraine E. Patten
Harold C. Kelly

BY

Griswold & Burdick
ATTORNEYS.

United States Patent Office 2,909,434
Patented Oct. 20, 1959

2,909,434

METHOD OF COATING ARTICLES OF FOOD AND PRODUCT OBTAINED THEREBY

Lorraine E. Patten and Harold C. Kelly, Midland, Mich., assignors to The Dow Chemical Company, Midland, Mich., a corporation of Delaware Application December 23, 1957, Serial No. 704,668

19 Claims. (Cl. 99—166)

This invention relates to coating compositions comprising cellulose ethers which are especially suited for enveloping certain articles of food, particularly meat and meat products, in tightly-adhering, protective coatings which may be readily stripped or peeled from the article. More particularly, it is concerned with such coating compositions that are applied from, or while they are in, the molten condition. Compositions of the indicated nature are frequently referred to as "hot melts" and, accordingly, are so characterized throughout the following description and specification. The present invention also has reference to a method for coating food articles with the referred-to compositions and to coated articles thereby obtained.

It would be advantageous to provide certain articles of food, particularly meat and meat products, with tough, unusually thin, closely conforming coatings which have protective and preservative value and which could be readily removed by clean and efficient stripping or peeling operations. It would be additionally beneficial for such a coating to be imbued with other desirable characteristics, including flexibility at temperatures which are commonly encountered in refrigerators and food freezers; attractive appearance and, as a general rule, a desirably very dry feel upon handling (being entirely free from having an oily or greasy character in this regard); relatively high impermeability to gases and water and other common vapors to minimize or prevent the occurrence of intolerable oxidation, dehydration or contamination in the coated foodstuff; and, as a primary requirement, absolute non-toxicity, i. e., freedom from any tendency to transfer deleterious or harmful materials to the foodstuff (including a quite limited transfer of oleaginous constituents). It would be desirable for such coatings to be available in a relatively translucent and pleasingly white colored condition. It would be an exceptional advantage and a pronounced benefit for such coatings to be obtainable from readily available and inexpensive materials and to be utilizable in a convenient and economical manner.

These desiderations and many other advantages and benefits which hereinafter are manifest may be realized with and achieved by coating compositions that are in accordance with the present invention which are basically comprised of a mixture that consists essentially of between about 20 and 50 percent by weight of ethyl cellulose; between about 15 and 68 percent by weight of a refined mineral oil; between about 5 and 10 or 20 to 40 percent by weight of a wax constituent (with the precise upper limit being dependent upon the maximum compatibility in the composition of the particular wax involved); and between about 10 and 25 percent by weight of a non-toxic plasticizer which is a solvent for the cellulose ether. Advantageously, compositions that are in accordance with the present invention may also be prepared so as to contain up to about 10 percent by weight, based on the weight of the composition, of an acid-accepting, epoxidized long chain fatty acid triglyceride or the like constituent; up to about 2 percent by weight of a non-toxic antioxidant component; and up to about 2 percent by weight of a suitable color-stabilizing ingredient.

All of the compositions of the present invention ordinarily form molten mixtures at temperatures that are in excess of the boiling point of water. The hot melts that are formed have desirably and quite advantageously low viscosity characteristics and have excellent color and viscosity stability, even upon exposure to heat while molten for periods of 48 hours and longer. The hot melts may be applied in any desired manner to articles which may be at any temperature beneath that of the hot melt. Advantageously, particularly when fresh meat or meat products are involved, the coating composition may be applied by a method which comprises freezing the article, or at least the surface of the article of food to be coated; and coating the frozen article with the molten composition. Such a method is beneficial in that the surface of the article being coated, particularly meats and the like, is less likely to thus be subjected to discoloring temperatures and vaporization of surface juices.

Brushing, spraying, splashing, dipping and other techniques may be employed in order to apply the beneficial coating compositions of the invention to the articles being coated. It is frequently expedient to employ dip coating techniques for this purpose, wherein the articles are dipped in a suitable molten composition to effect the coating "pick-up," after which they are withdrawn and the applied coating composition permitted to cool and harden. In many cases, however, particularly when high production rates must be attained, it is exceptionally expedient to employ spray or splash coating techniques in order to manufacture the desired coated articles, wherein each of the articles to be coated is passed under or over, or both, one or more sprays of the molten composition or through one or more curtains or sheets thereof, or is otherwise splashed thoroughly therewith, to cover their entire surface in order to effect the desired "pick-up" of the coating. The precise constitution of the compositions that are employed may vary according to preferred embodiments, as will hereinafter be more fully delineated, each depending somewhat for optimum effect on the precise coating technique that is intended to be employed. In this way, under any given conditions of application, the operation may be most beneficially facilitated and the most effective and advantageous application of the desired coating provided on the articles.

Coated articles of food, particularly meats, in accordance with the present invention generally have an attractive and pleasing appearance. As a rule, the applied coating is translucent and white colored. If desired, especially when machine application of the coating is being made, attractive "two-tone" packages can be prepared by using the translucent coating of the present invention for the bottom and sides of the package with a transparent film or hot melt coating top. Such a coating procedure is especially effective for packaging such foodstuffs as luncheon meats. In addition, the present coatings may be applied in exceptionally thin layers on the coated article. Frequently, for example, excellent and completely satisfactory coatings can be applied having average thicknesses as low as about 5–10 mils, particularly when the hot melt is sprayed on the article being coated.

Unlike most of the coatings from conventional hot melt compositions, the coatings of the present invention are not at all sticky, oily, greasy or otherwise objectionable or uncomfortable to touch or handle. As a matter of fact, the coatings of the present invention generally have a desirable and quite acceptable relatively "dry" feel upon being handled and are not in the slightest objectionable from such viewpoint. Neither do they cause oleaginous deposits or contamination to occur upon the hands of a person or upon other surfaces with which they may come in contact. They are actually outstanding in this regard. The coatings which are provided adhere tightly as an exceptionally thin film about the articles and conform closely to their contours, even when bony meats or fowl are involved. They are non-toxic and odorless and do not impart odors or tastes to the food being coated. They are readily peelable, cuttable or strippable in a clean and efficient manner from the article of food. Thus, they do not require resort to washing or other tedious and inconvenient procedures for their complete removal.

As indicated, the coatings are relatively flexible and remain remarkably strong and tough at temperatures as low as about −20° F. so that they resist damage due to handling (including severe scuffing and jostling) and storage of a coated article being maintained in a frozen condition. They also have an extremely low rate of water vapor transmission. Their characteristics in this regard are comparable to those which are found in other distinct varieties of ethyl cellulose type coatings. Thus, the coated articles may be preserved in a better condition and are less susceptible to becoming rancid or dehydrated or to develop "freezer burn." Despite their advantageous relative impermeability, however, the coatings of the present invention are adapted to permit passage of sufficient oxygen so that coated fresh meats, for example, can readily retain their desirably fresh and natural bright red color. In addition, the applied coating compositions of the present invention effectively prevent the absorption of undesirable foreign odors and tastes in the food product.

The ethyl cellulose which may be employed in the practice of the present invention is a commonly available material having ethoxyl content in the range from about 47.5 to about 50 percent by weight. In many cases it may be desirable to utilize a cellulose ether having an ethoxyl content of from about 48.0 to 49.5 percent by weight. Its viscosity, as determined in a solution of about 5 percent by weight of the ethyl cellulose in a solvent mixture consisting of about 80 parts by volume of toluene and by about 20 parts by volume of ethanol, may be from about 6 to about 200 centipoises (cps.). In many cases, it is more convenient and may be of greater expediency and practicality to employ a cellulose ether having a viscosity that is not in excess of about 50 cps. The particular viscosity grade of cellulose ether that is employed as well as the precise formulation of composition that is utilized depends, as has been indicated, upon the manner of application contemplated for the particular composition being used to coat the articles. For example, when a dip application of the coating is intended to be made, the viscosity of the cellulose ether that is employed should not be in excess of about 30 cps., and, even more beneficially, may be in the neighborhood of 6 to 11 cps. When the coating is to be applied by spraying or splashing techniques which generally are accomplished by means of apparatus or machinery which is adapted for such purpose, a higher viscosity cellulose ether may generally be utilized and a more viscous overall composition employed.

As mentioned, the oleaginous constituent that is employed in the compositions of the present invention is a refined mineral oil of a paraffinic variety or an equivalent material derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to employ.

The plasticizer or plasticizing component which is utilized should be a solvent for the cellulose ether which is compatible with other constituents of the composition. Suitable plasticizers for practice of the present invention include such colorless, odorless and non-toxic materials as those which are ester plasticizers for ethyl cellulose, such as alkyl phthalyl alkyl glycolates (specifically methyl phthalyl ethyl glycolate; ethyl phthalyl ethyl glycolate; and butyl phthalyl butyl glycolate); trialkyl esters of acyl citric acid (specifically acetyl tributyl citrate such as that which may be obtained under the trade-designation "Citroflex A-4"); dialkyl adipates (specifically diisobutyl adipate); various acetylated mono- and di-fatty acid glycerides; certain trialkyl phthalates (specifically di-2-ethylhexylphthalate); various fatty acid ester derivatives (including glycerol mono-oleate; glycerol mono-stearate; and n-butyl stearate); alkyl-aryl phosphates; castor oil and the like. It may frequently be beneficial to employ mixtures of various plasticizing materials in the hot melt compositions. The plasticizer acetyl tributyl citrate may be utilized with great advantage for purposes of the invention. Castor oil may also be employed with benefit and such plasticizers as butyl phthalyl butyl glycolate are likewise quite suitable for use.

The epoxidized long chain fatty acid triglycerides that may be employed in the practice of the present invention are useful to inhibit hydrolytic degradation of the ethyl cellulose. Such materials are sometimes referred to as being epoxidized natural glycerides of unsaturated fatty acids. Ordinarily, they are derived from fatty acids that contain between about 12 and 22 carbon atoms. Such acid-accepting epoxy materials may be specifically typified and particularized by such compositions as epoxidized soya bean oil, including those products of this variety which may be obtained under the trade-designations "Paraplex G-60" and "Paraplex G-62," respectively.

Various non-toxic antioxidants are also advantageous to employ in the compositions of the invention in order to inhibit oxidative degradation of the ethyl cellulose and any fatty acid glycerides that may be present therein. Typical of such antioxidants are butylated hydroxy anisol; nordihydroguaiaretic acid; 2,6-ditertiary butyl-4-methyl phenol which is obtainable under the trade-designation "Ionol"; certain substituted butylated phenols such as those which are commercially available under the trade-designation "Voidox"; and 2,2'-thiobis (4-methyl-6-tert. butyl phenol) which may be obtained commercially as "Santonox."

It is also beneficial in many instances to incorporate certain non-toxic color stabilizers in the compositions to facilitate the retention of a desirably clear and free from discoloration condition in the coating. Advantageously, the color stabilizers that may be utilized are such organic acids as citric acid, tartaric acid, and other polycarboxylic acids, including hydroxyacid forms, especially those that contain from 2 to about 6 carbon atoms in their molecules. Other color stabilizers which may be employed include various organic phosphites such as tricresyl phosphite and mixed organic phosphite-epoxy compounds including those that may be obtained under the trade-designations "Advastab CH-49" and "Advastab CH-201."

Any of a wide variety of waxes may be utilized in the practice of the present invention, including petroleum (and petroleum-like) waxes, insect waxes, vegetable waxes and the like waxes, and certain synthetic waxes, all of which melt at temperatures above about 100° F. Thus, such materials as paraffin wax; low molecular weight, wax-like polyethylene; microcrystalline wax; hydrogenated castor oil (a synthetic wax) such as those which are commercially available under the trade-designations "Hydrofol Glycerides–200," "Castor Wax" and "Emery S 751 R Hydrogenated Castor Oil"; ceresin; ozokerite; cork wax (cerin); carnauba wax; Chinese wax; spermaceti; wool wax; beeswax and the like or equivalent cereous substances. For obvious reasons, certain waxes are not well suited for utilization in the practice of the present invention due to their preventive character. Typical of such materials is Japan wax, which in its usually obtained form has an obnoxious, pronouncedly rancid odor. As indicated, at least about 5 percent by weight, based on the weight of the composition, is included in the hot melt formulations of the present invention. The precise maximum quantity of wax which may be utilized in a given composition generally depends upon the compatibility of a specific wax constituent being employed in the composition and the tolerability of the latter therefor. The upper limits may be found to vary over wide ranges with various waxes. Thus, as much as 40 percent by weight of such petroleum waxes as paraffin wax may be incorporated in the composition whereas a much smaller quantity, usually not in excess of about 10 percent, of certain other petroleum waxes such as microcrystalline wax can be tolerated. Usually up to about 20 percent by weight of most insect and vegetable waxes, such as beeswax and carnauba wax, can be employed satisfactorily. Such synthetic waxes as hydrogenated castor oil can ordinarily be tolerated by the compositions in maximum amounts up to about 25 percent by weight.

The wax constituent serves to effectively control and minimize the viscosity characteristics of the resulting hot melt. This is of particular advantage when dip and the like applications are contemplated for the coating wherein excessively viscous hot melts are ordinarily undesirable to employ. It is also of benefit when machine spraying or splashing applications are utilized, despite the fact that more viscous compositions are generally easier and more suitable to handle by such means. The possibilities of handling less viscous hot melts and of applying thinner coatings on the foodstuff articles are real and significant economical advantages insofar as the user is concerned. The minimized costs for equipment and handling of the less viscous composition, as well as the greater economy of the thinner applied coatings will be immediately apparent to those skilled in the art.

Suitable operative ranges of the various compositions of the present invention are, for sake of clarifying particularization, set forth in the following tabulation, wherein all numerical proportions are given on a percent by weight of the total composition basis.

RECIPE I.—SUITABLE FORMULATIONS

Ingredient: Percent
 Ethyl cellulose _____ 20–50.
 Non-toxic plasticizer _____ 10–25.
 Refined mineral oil _____ 15–68.
 Wax _____ 5—maximum indicated limit of compatability, depending on type.
 Epoxidized natural glyceride of unsaturated fatty acids _____ 0–10.
 Antioxidant _____ 0–2.
 Color stabilizer _____ 0–2.

Frequently, the greatest advantage and benefit may be achieved in the practice of the present invention when a paraffin wax, especially one melting at about 135° F., or a synthetic hydrogenated castor oil wax are employed for the preparation of the compositions and when certain combinations of other ingredients are employed. Accordingly, in the following tabulation there are set forth both highly satisfactory mixtures and typical formulations therewithin for use for the present purposes using either paraffin wax or hydrogenated castor oil.

RECIPE II.—CERTAIN FORMULATIONS

| Ingredient | Optimum Range for Paraffin Wax Formulations | Typical Paraffin Wax Formulations | Optimum Range For Synthetic Wax Formulations | Typical Synthetic Wax Formulations |
|---|---|---|---|---|
| Ethyl Cellulose | a23–30 | b25 | a23–30 | b25 |
| Acetylated Monoglyceride | c1–3 | 2.5 | c1–3 | 1.5 |
| Glycerol Monoleate | c1–3 | 2.4 | c1–3 | 1.4 |
| Castor Oil | c8–11 | 10 | c8–11 | 10 |
| Epoxidized Natural Glyderid of Unsaturated Fatty Acids | 1–5 | 5 | 1–5 | 2 |
| Citric Acid | 0–0.15 | 0.1 | 0–0.15 | 0.1 |
| Refined Mineral Oil | 30–45 | c35 | 35–45 | c40 |
| Wax | 18–23 | d20 | 18–23 | 20 |

NOTE:
 a Viscosity—50 cps. or less.
 b Std. grade—1.0 cps. "Ethocel."
 c Average viscosity at 100° F. ca. 100 Saybolt units.
 d Melting at 135° F.
 e Optimum range of total combined plasticizer components is from 10 to 17 percent.

In preparing the hot melt coating compositions of the present invention, care should be taken to select such relative proportions of the ingredients as will produce a coating having optimum characteristics within the range dictated by its own inherent limitations. In addition, as has been indicated, both the proportions and the nature of the specific ingredients employed should take into account the type of application intended for the composition, particularly with respect to the viscosity of the cellulose ether constitutent and the proportions of both the oleaginous and wax constituents that are employed. Thus, with some combinations of ingredients, a larger proportion of the ethyl cellulose or a higher viscosity grade of such constituent may produce a more viscous hot melt than is desirable for particular operating temperatures or particular modes of application whereas smaller proportions, in some instances, may not lend sufficient strength to the film coating. Smaller quantities of the oleaginous constitutent may also increase the viscosity of the hot melt. Too much plasticizer may at times produce a film coating which is softer than might be otherwise obtained. The same consequence may result from various combinations of the epoxidized natural glyceride of unsaturated fatty acids (when such constituent is utilized) especially in its combination with the plasticizing ingredient. On the other hand, the use of too small a quantity of the plasticizer may, in certain instances, impart undesirable brittle characteristics to the film coating. Likewise, as has been indicated, greater than compatible or tolerable proportions of the wax may result in phase separation of the wax constituent in the hot melt or in a film coating which tends to be more brittle than desirable.

Although any desired thickness of coating may be applied on a given foodstuff, a properly formulated composition should permit applied film thicknesses to be obtained by hot dipping techniques that are between about 25 and 100 mils, and advantageously from about 50 to 85 mils, with a single immersion and moderately slow withdrawal (say, within several seconds) of the article desired to be coated. Of course, as can readily be appreciated, generally thinner or thicker coatings can be obtained, if desired, by variations in applicating technique, as will be apparent to those who have the skill of their calling (especially when other than dip coating techniques are utilized). As a matter of fact, it may oftentimes be economically attractive for the thicknesses of the applied coatings to be in the neighborhood, as indicated, of 5–10 mils or so.

Since the hot melt compositions of the present invention are at relatively high temperatures during their application, it is advantageous to coat many articles while they are in a frozen condition. This minimizes the possibility of causing slight surface discoloration and dehydration of the foodstuff, particularly when meat and meat products are being coated. It also obviates any objections to the coated articles which may arise for such reasons. The discolorations which may occur from coating food articles at normal temperatures are innocuous, however, and bear no relationship to their quality of wholesomeness in any consideration other than appearance. Thus, if it is otherwise suitable, articles which are not in a frozen condition may be satisfactorily coated with the compositions of the present invention. As a matter of fact, there are many instances when no significant advantage may be derived by chilling or freezing the article before coating. This may be the case, for example, when various smoked or cured meats, fish or fowl are being coated. The normal, treated appearance of such foodstuffs is acceptable and does not detract from their marketability, although they actually are discolored from a natural condition.

The invention is further illustrated in and by the following examples wherein, unless otherwise indicated, all parts and percentages are to be taken by weight.

Example "A"

Figure 2:
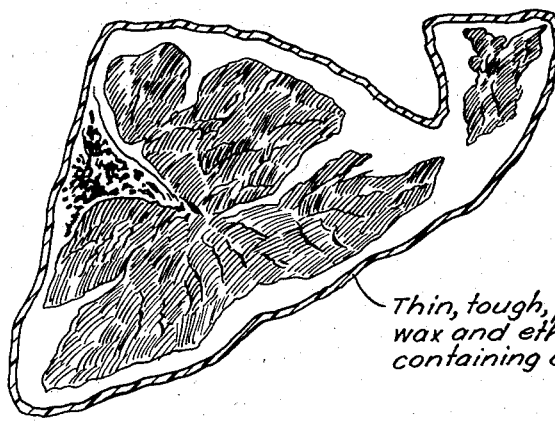

Various cuts of meat, including those from beef and pork were coated by first freezing and then dip coating them with a hot melt at about 320° F. which was comprised of about 25 parts of ethyl cellulose of a viscosity grade of about 10 cps. ("Ethocel"); about 40 parts of a refined mineral oil mixture which consisted of a refined mineral oil having a viscosity between about 95 and 105 Saybolt units at 105° F. ("White Oil L-1"); and about 14.9 parts of a plasticizer combination consisting of about 10 parts of a refined and deodorized castor oil ("Crystal-O"); 2.5 parts of an acetylated mono-glyceride ("Myvacet 9-40"); about 2.4 parts of glycerol monooleate ("Myverol 18-71"); about 5 parts of "Paraplex G-62"; about 0.1 part of citric acid and about 20 parts of paraffin wax melting at 135° F. The hot melt was relatively thin and easy to handle. After the dipping, the applied coating was allowed to cool and harden. All of the coated articles, as schematically illustrated in a perspective view in Figure 1 and in cross-section in Figure 2 of the accompanying drawing, had an attractive and pleasing appearance and were not objectionable to the touch. The applied coating adhered tightly to each of the articles and conformed closely to them as a thin enveloping film about their various irregular contours. It was translucent and whitish in color. The coating was remarkably tough and did not become embrittled at freezing temperatures. It did not rupture upon repeated dropping of the frozen articles or even when the articles were subjected to such purposely abnormal and abusive handling as being repeatedly thrown and skidded over concrete floors. It could be stripped cleanly from the articles without remnants or segments of the coating adhering to the foodstuff. This permitted the articles to be obtained in their normally available condition after being freed of the coating. In addition, the coating provided excellently indefinite protection against weight loss or "freezer burn." As a result, no appreciable indications of such conditions are observed in coated articles that are maintained in a frozen condition for periods as long as a year or more.

About the same results were achieved when the same hot melt was formulated without the epoxy compound or the color stabilizer, with the exception that the stability of the hot melt is not quite as good.

Equivalent results are similarly obtainable with other types and varieties of meat, and with poultry, if care is taken to suitably plug or cover the cavities in their dressed carcasses. Various cheeses may also be coated satisfactorily with the above hot melt composition and others in accordance with the invention.

Example "B"

The procedure of Example "A" was repeated with a coating composition having the same formulation excepting to employ 20 parts of hydrogenated castor oil ("Hydrofol Glycerides-200") as the wax constituent in place of the paraffin wax and only 2.0 parts of "Paraplex G-62." Results commensurate to those obtained in Example "A" were achieved when the same coating procedure as therein described was repeated on various foodstuffs, including meats. Similar results were achieved with a synthetic wax-containing hot melt made up without the "Paraplex G-62" or the citric acid, excepting that the stability of the melt was not quite as good. Similar good results may also be obtained when other of the formulations within the scope of the invention are employed for the coating of meat and other foodstuffs.

It is to be fully understood that the scope and purview of the present invention is to be construed from the following claims rather than strictly from the foregoing docent specification and description.

What is claimed is:

1. Method for coating articles of food which comprises the steps of (1) applying to the article, while it is being maintained at a relatively lower temperature, a thin enveloping film of a coating from a composition in molten form comprising essentially (a) from 20 to 50 percent by weight of the composition of an ethyl cellulose having an ethoxyl content between about 47.5 and 50 percent by weight and a viscosity between about 6 and 200 centipoises, as determined in a 5 percent by weight solution thereof in an 80:20 mixture, by volume, of toluene and ethanol; (b) between about 15 and 68 percent of a refined mineral oil having a Saybolt viscosity at 100° F. between about 80 and 400 units; (c) an amount between that which is a quantity in excess of 5 percent by weight and the maximum compatible quantity of up to about 40 percent by weight of a wax constituent melting at about 100° F.; and (d) between about 10 and 25 percent by weight, based on the weight of the composition, of a colorless, odorless, non-toxic plasticizer component which is a solvent for the cellulose ether; and (2) cooling the applied coating on the article to a hardened condition.

2. The method of claim 1, wherein said article of food is in a frozen condition during the application of said composition.

3. The method of claim 1, wherein said wax constituent in said composition is paraffin wax in an amount between that which is a quantity in excess of 5 and about 40 percent by weight.

4. The method of claim 1, wherein said wax constituent in said composition is microcrystalline wax in an amount between that which is a quantity in excess of 5 and about 10 percent by weight.

5. The method of claim 1, wherein said wax constituent in said composition is beeswax in an amount between that which is a quantity in excess of 5 and about 20 percent by weight.

6. The method of claim 1, wherein said wax constitutent in said composition is carnauba wax in an amount between that which is a quantity in excess of 5 and about 20 percent by weight.

7. The method of claim 1, wherein said wax constituent in said composition is synthetic hydrogenated castor oil wax in an amount between that which is a quantity in excess of 5 and about 25 percent by weight.

8. The method of claim 1, wherein said composition contains from 23 to 30 percent by weight of said ethyl cellulose ether having a viscosity not in excess of about 50 centipoises; from 35 to 45 percent of said refined mineral oil; from 18 to 23 percent of paraffin wax; and from 10 to 17 percent of said plasticizer component.

9. A method in accordance with the method set forth in claim 8, wherein said plasticizer component in said composition is composed of from about 1 to 3 percent by weight of an acetylated mono-glyceride; from about 1 to 3 percent by weight of glycerol mono-oleate; and from about 8 to 11 percent by weight of castor oil.

10. The method of claim 1, wherein said composition contains from about 23 to 30 percent by weight of said cellulose ether having a viscosity not in excess of about 50 centipoises; from about 35 to 45 percent of said refined mineral oil; from 18 to 23 percent of synthetic hydrogenated castor oil wax; and from 10 to 17 percent of said plasticizer component.

11. The method of claim 1, wherein said composition contains from 23 to 30 percent by weight of said ethyl cellulose ether having a viscosity not in excess of about 50 centipoises; from 35 to 45 percent of said refined mineral oil; an amount between that which is a quantity in excess of 5 and 10 percent of microcrystalline wax; and from 10 to 17 percent of said plasticizer component.

12. The method of claim 1, wherein said composition contains in combination therewith and in addition thereto, up to about 10 percent by weight of an epoxidized long chain fatty acid triglyceride derived from unsaturated fatty acids, which fatty acids contain from 12 to 22 carbon atoms in their structures.

13. A method in accordance with the method set forth in claim 12, wherein said epoxidized natural glyceride of unsaturated fatty acids is an epoxidized soya bean oil.

14. The method of claim 1, wherein said composition includes in combination therewith and in addition thereto, up to about 2 percent by weight, based on the weight of the composition, of a non-toxic antioxidant for said cellulose ether.

15. The method of claim 1, wherein said composition includes in combination therewith and in addition thereto, up to about 2 percent by weight, based on the weight of the composition, of a hydroxy acid selected from the group consisting of citric acid and tartaric acid.

16. The method of claim 1, wherein the plasticizer component in said composition is acetyl tributyl citrate.

17. The method of claim 1, wherein the plasticizer component in said composition is butyl phthalyl butyl glycolate.

18. The method of claim 1, wherein the plasticizer component in said composition comprises a refined and deodorized castor oil.

19. A coated food article as produced by the method of claim 1.

References Cited in the file of this patent

UNITED STATES PATENTS

| | | |
|---|---|---|
| 2,082,592 | Nollau | June 1, 1937 |
| 2,349,134 | Bradshaw | May 16, 1944 |
| 2,373,278 | Traylor | Apr. 10, 1945 |
| 2,394,101 | Phillips et al. | Feb. 5, 1946 |
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |
| 2,840,476 | Wirt et al. | June 24, 1958 |

FOREIGN PATENTS

| | | |
|---|---|---|
| 419,688 | Great Britain | Nov. 16, 1934 |